(12) United States Patent
Yun et al.

(10) Patent No.: US 8,410,917 B2
(45) Date of Patent: Apr. 2, 2013

(54) HAPTIC FEEDBACK DEVICE FOR A PORTABLE TERMINAL

(75) Inventors: In-Kuk Yun, Suwon-si (KR); In Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 661 days.

(21) Appl. No.: 12/637,380

(22) Filed: Dec. 14, 2009

(65) Prior Publication Data

US 2010/0148945 A1  Jun. 17, 2010

(30) Foreign Application Priority Data

Dec. 12, 2008  (KR) ........................ 10-2008-0126617

(51) Int. Cl.
*G08B 6/00* (2006.01)

(52) U.S. Cl. .................... 340/407.2; 340/7.6; 340/407.1; 341/27; 341/35; 345/156; 345/169; 715/702

(58) Field of Classification Search ............... 340/407.1, 340/407.2, 7.6, 825.19; 341/21, 27, 35; 345/156, 345/161, 163, 167, 169, 173, 184; 455/566; 715/702, 727, 864

See application file for complete search history.

(56) References Cited

U.S. PATENT DOCUMENTS

| | | | |
|---|---|---|---|
| 2005/0231466 A1* | 10/2005 | Tada | 345/156 |
| 2006/0030375 A1* | 2/2006 | Tanaka | 455/575.1 |
| 2006/0082554 A1* | 4/2006 | Caine et al. | 345/167 |
| 2007/0152974 A1 | 7/2007 | Kim et al. | |
| 2007/0236450 A1* | 10/2007 | Colgate et al. | 345/156 |
| 2008/0018614 A1* | 1/2008 | Rekimoto | 345/173 |
| 2010/0188327 A1* | 7/2010 | Frid et al. | 345/156 |
| 2011/0138277 A1* | 6/2011 | Grant et al. | 715/702 |

FOREIGN PATENT DOCUMENTS

| | | |
|---|---|---|
| JP | 2005-071157 | 3/2005 |
| KR | 1020070106147 | 11/2007 |

* cited by examiner

*Primary Examiner* — Brent Swarthout

(74) *Attorney, Agent, or Firm* — The Farrell Law Firm, P.C.

(57) ABSTRACT

A haptic feedback device for a portable terminal. The haptic feedback device includes an input member, a vibration member that passes through the input member, and serves as a rotation axis of the input member, and a piezo actuator in contact with the vibration member. As the input member rotates or pivots with respect to the rotation axis, the piezo actuator actuates to vibrate the vibration member.

9 Claims, 6 Drawing Sheets

HAPTIC FEEDBACK DEVICE FOR A PORTABLE TERMINAL

PRIORITY

This application claims priority under 35 U.S.C. §119(a) to a Korean Patent Application filed in the Korean Intellectual Property Office on Dec. 12, 2008 and assigned Serial No. 10-2008-0126617, the entire disclosure of which is incorporated herein by reference.

BACKGROUND OF THE INVENTION

1. Field of the Invention

The present invention relates generally to a portable terminal, and more particularly, to a haptic feedback device for a portable terminal, which provides a haptic feedback function to an input device of the portable terminal such as a jog dial, a wheel key, a 2-way key, etc.

2. Description of the Related Art

Haptic feedback, often referred to as simply "haptics", is the use of the sense of touch in a user interface design to provide information to an end user. When referring to mobile phones and similar devices, this generally means the use of vibrations from the device's vibration alarm to denote that a touchscreen button has been pressed. In this particular example, the phone would vibrate slightly in response to user activation of an on-screen control, making up for the lack of a normal tactile response that the user would experience when pressing a physical button.

It is also common for a touch-screen phone to include a jog dial, a wheel key, or a navigation key for, e.g., menu search. However, the jog dial, wheel key, or navigation key, is not provided with a haptic feedback function, or merely provides a sense of clicking by using a conventional dome switch, failing to be in harmony with vibrational tactile sense provided by the haptic feedback function for touch screen manipulation. That is, the haptic feedback function using an operation of a vibration motor is provided in touch screen manipulation, but the jog dial or wheel key cannot provide the same haptic feedback function or merely provides a sense of clicking by using a separate structure. Further, if the jog dial or wheel key is not provided with a haptic feedback function, a user is inconvenienced by having to intently watch the screen to check if a desired operation is performed, when manipulating the jog dial or wheel key.

SUMMARY OF THE INVENTION

The present invention is designed to address at least the above problems and/or disadvantages and to provide at least the advantages described below. Accordingly, an aspect of the present invention is to provide a haptic feedback device for a portable terminal, which enables a user to recognize a manipulation state of an input member, such as a jog dial, a wheel key, a navigation key, etc., which is separate from a touch screen, through tactile sense.

Another aspect of the present invention is to provide a haptic feedback device for a portable terminal, having a diverse a vibration pattern implementing a haptic feedback function by vibrating only a part manipulated by a user on the terminal.

In accordance with an aspect of the present invention, there is provided a haptic feedback device for a portable terminal. The haptic feedback device includes an input member installed on the portable terminal, a vibration member installed to pass through the input member, the vibration member providing a rotation axis of the input member, and a piezo actuator connected to the vibration member, in which as the input member rotates or pivots with respect to the rotation axis. The piezo actuator is actuated to vibrate the vibration member.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Hereinafter, certain embodiments of the present invention will be described in detail with reference to the accompanying drawings. Detailed descriptions of well-known functions and constructions are omitted for clarity and conciseness.

Figure 1:
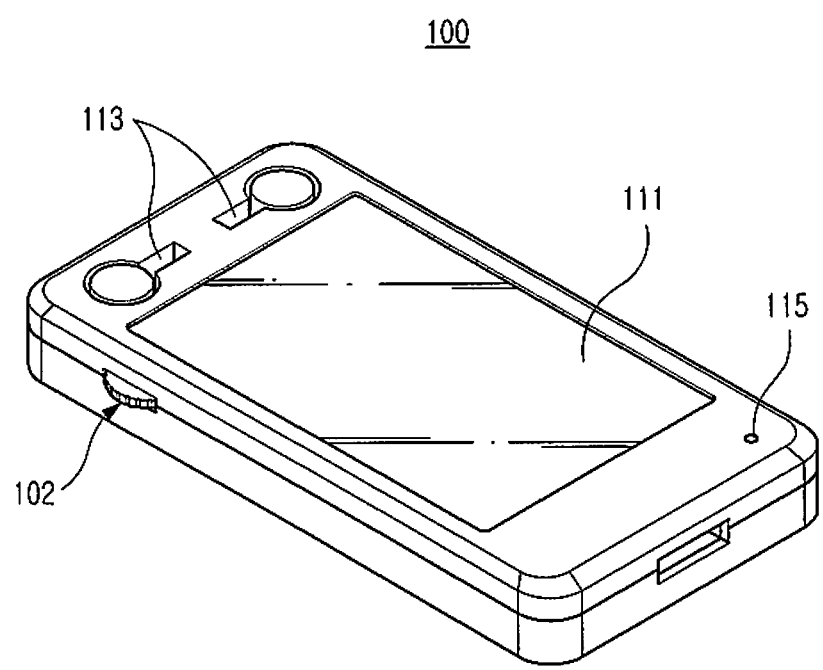
FIG. 1 is a perspective view of a portable terminal including a haptic feedback device according to an embodiment of the present invention.
Figure 2:
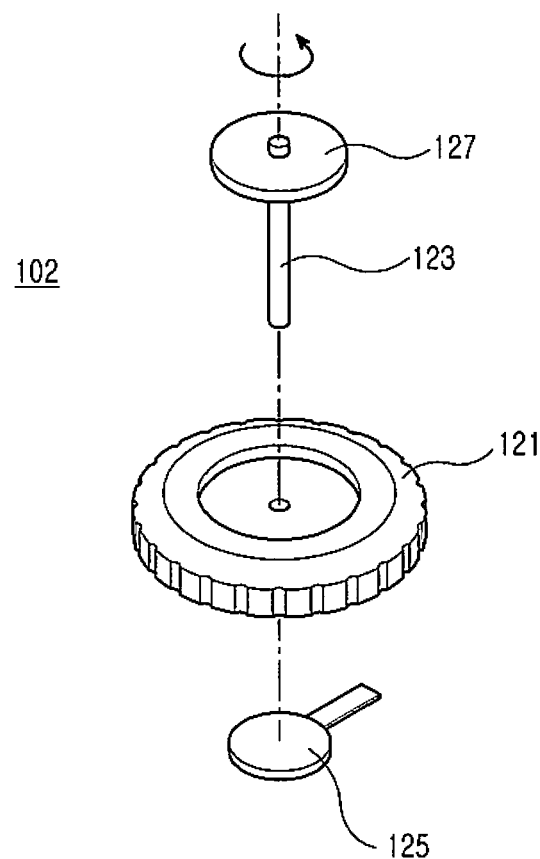
FIG. 2 is an exploded perspective view of the haptic feedback device of the portable terminal illustrated in FIG. 1.
Figure 3:
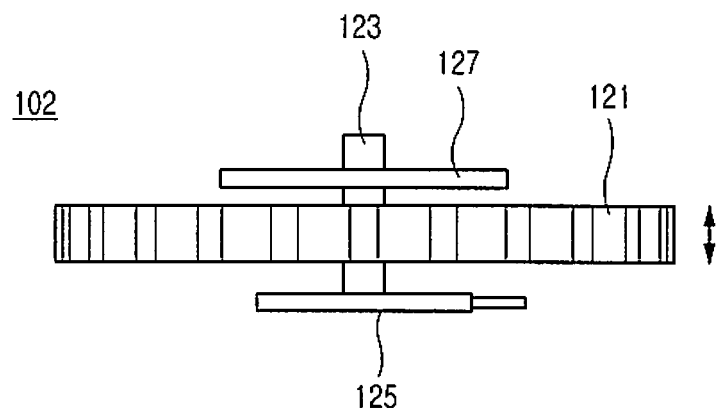
FIG. 3 is a side view of the haptic feedback device of the portable terminal illustrated in FIG. 1.

FIG. 1 illustrates a portable terminal 100 including a haptic feedback device 102 according to an embodiment of the present invention, and FIGS. 2 and 3 illustrate the haptic feedback device 102 illustrated in FIG. 1.

Referring to FIG. 1, the portable terminal 100 is a touch-screen phone including a display device 111 having a touch screen function. A speaker device 113 and a microphone device 115 are installed in upper and lower portions with respect to the display device 111, respectively. In addition to the touch screen function provided through the display device 111, the portable terminal 100 includes a separate vibration motor (not shown) that enables a user to recognize touch screen manipulation through tactile sense.

Additionally, in accordance with an embodiment of the present invention, the portable terminal 100 includes a haptic feedback device 102, which according to the current embodiment, includes a jog dial 121.

Referring to FIGS. 2 and 3, the haptic feedback device 102 includes the jog dial 121 operating as an input member, a vibration member 123, and a piezo actuator 125. Additionally, on the vibration member 123, a separate stopper 127 may be installed.

The jog dial 121 is in a disc shape having a generally uniform thickness, a portion of the circumference thereof being exposed through a side surface of the portable terminal 100. For example, a user can adjust the volume of sound being output from the terminal 100 or navigate a menu or stored information by manipulating the jog dial 121. Further, if the user views the Internet or a document using the portable terminal 100, the user may move a cursor by manipulating the jog dial 121.

The vibration member 123 passes through the jog dial 121, such that it supports rotation of the jog dial 121 and performs straight-line reciprocating movement, i.e., vibration, along a rotation axis of the jog dial 121 according to an operation of the piezo actuator 125. Optionally, the stopper 127 is installed at an end of the vibration member 123.

The piezo actuator 125 is adhered to the other end of the vibration member 123. Accordingly, when the piezo actuator 125 operates, the vibration member 123 vibrates. Along with the vibration of the vibration member 123, the jog dial 121 vibrates along its rotation axis, a movement range thereof being limited between the piezo actuator 125 and the stopper 127. Consequently, the vibration member 123 supports rotation of the jog dial 121 and at the same time, guides movement of the jog dial 121 along the rotation axis.

As described above, the stopper 127 is not necessarily installed, as the jog dial 121, when moving along its rotation axis in the terminal 100, is also held in place by a housing of the terminal 100, thus, limiting a movement range thereof.

The piezo actuator 125 vibrates in different patterns according to a control signal applied thereto. Because a feeling of vibration when the jog dial 121 is interfered by the stopper 127 is different from that when the jog dial 121 is not interfered by the stopper 127, various vibrational tactile sensations can be provided to a user by using interference between the stopper 127 and the jog dial 121, as well as a vibration pattern of the piezo actuator 125. That is, if two vibrational tactile sensations can be provided through the vibration pattern of the piezo actuator 125, they can also be provided in each of a state in which the stopper 127 and the jog dial 121 contact each other and a state in which they do not contact each other.

It can be easily understood by those of ordinary skill in the art that the position of the jog dial 121 may be adjusted between the stopper 127 and the piezo actuator 125 due to the operational characteristics of the piezo actuator 125.

By taking advantage of the operational characteristics of the piezo actuator 125, the jog dial 121 pressed into contact with the stopper 127, upon occurrence of a specific event. For example, when a pull down menu is selected using the jog dial 121, i.e., is pulled down, the piezo actuator 125 is actuated to cause the jog dial 121 to contact the stopper 127. When the jog dial 121 comes into contact with the stopper 127, a vibrational tactile sensation is different from that in a non-contact state and more force will be required to rotate the jog dial 121 due to friction between the jog dial 121 and the stopper 127. By recognizing such a change in the vibrational tactile sensation and a need for more force to rotate the jog dial 121, the user is able to sense that the cursor cannot move downward any more.

Figure 4:
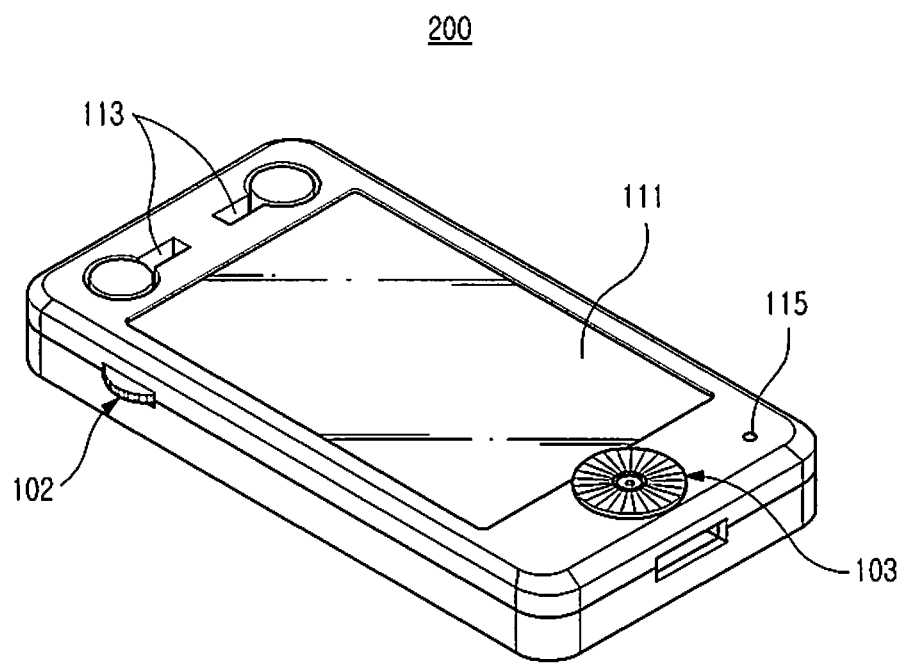
FIG. 4 is a perspective view of a portable terminal including a haptic feedback device according to an embodiment of the present invention.

FIG. 4 is a perspective view of a portable terminal 200 including a haptic feedback device 103 according to an embodiment of the present invention. The portable terminal 200 has a similar structure to the portable terminal 100 illustrated. Therefore, repeated descriptions of the same components will be omitted below.

Referring to FIG. 4, the portable terminal 200 is different from the portable terminal 100 in that the haptic feedback device 103 is installed on a surface of the portable terminal 200, specifically, at a side of the display device 111. The haptic feedback device 103 includes a wheel key installed on a surface of the display device 111, and the wheel key is similar to the jog dial 121. Although the jog dial 121 is exposed through a side surface of the portable terminal 100, the wheel key of the haptic feedback device 103 is installed such that a surface of the wheel key is exposed on a surface of the portable terminal 200.

A vibration member, a piezo actuator, and a stopper according to the current embodiment are identical to or at least similar to those according to the previous embodiment, and thus a description thereof will not be provided. However, in the haptic feedback device 103, a separate decoration member may be attached to the wheel key to prevent the stopper from being directly exposed to outside.

Figure 5:
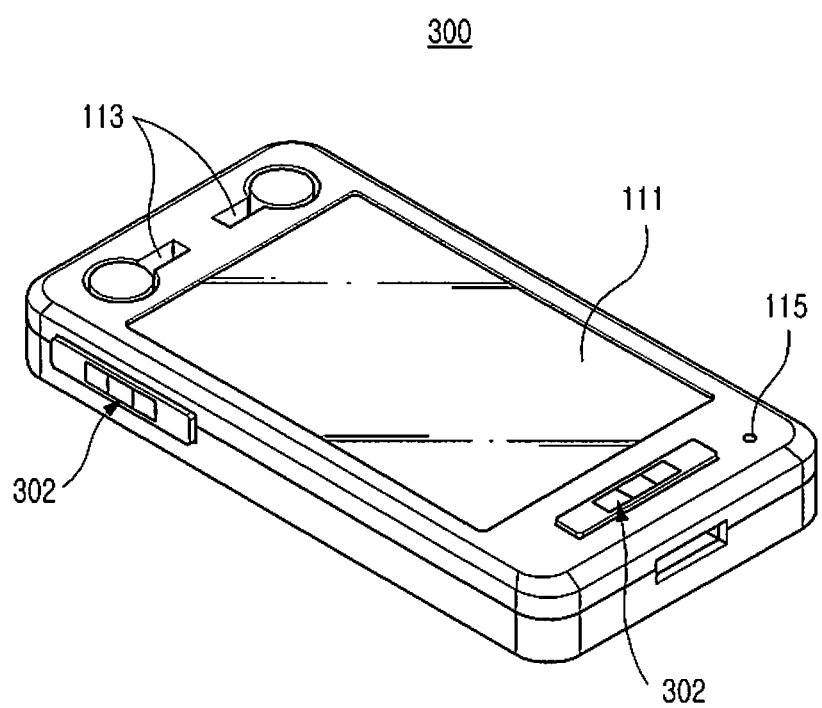
FIG. 5 is a perspective view of a portable terminal including a haptic feedback device according to an embodiment of the present invention.
Figure 6:
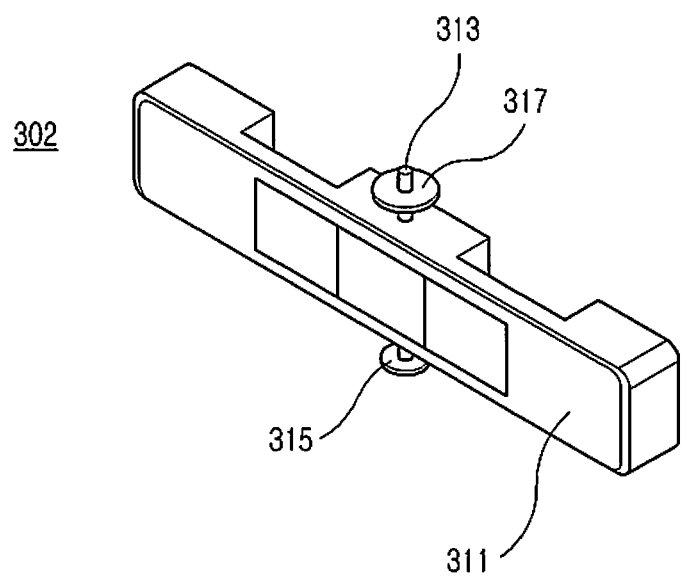
FIG. 6 is a perspective view of the haptic feedback device of the portable terminal illustrated in FIG. 5.

FIG. 5 illustrates a portable terminal 300 including a haptic feedback device 302 according to an embodiment of the present invention, and FIG. 6 illustrates the haptic feedback device 302 illustrated in FIG. 5.

Referring to FIGS. 5 and 6, the haptic feedback device 302 is installed both on a side surface of the portable terminal 300 and at a side of the display device 111, and uses a navigation key 311 as an input member unlike in the previous embodiments. While a 2-way key is shown as the navigation key 311 by way of example, a 4-way key commonly used in a cellular phone may also be installed as the navigation key 311.

The haptic feedback device 302 includes a vibration member 313 passing through a central portion of the navigation key 311 in a widthwise direction, with a stopper 317 being installed at an end of the vibration member 313 and a piezo actuator 315 being installed at another end of the vibration member 313. The navigation key 311 performs input operations at both ends thereof by pivoting with respect to the vibration member 313.

Figure 7:
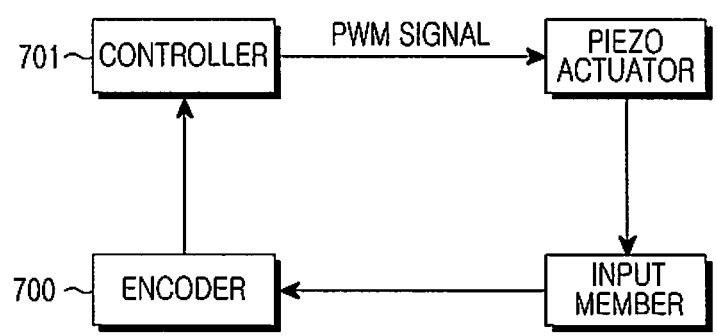
FIG. 7 is a view for describing an operation flow of a haptic feedback device according to an embodiment of the present invention.

FIG. 7 is a view for describing an operation flow of a haptic feedback device according to an embodiment of the present invention.

Referring to FIG. 7, each haptic feedback device includes an encoder 700 and a controller 701 in addition to the aforementioned input member, vibration member, and piezo actuator. The encoder 700 senses if the input member, such as the jog dial, the wheel key, or the navigation key, is manipulated. The controller 701 generates a control signal for actuating the piezo actuator.

Upon user manipulation of the input member, the input member rotates or pivots. The encoder 700 senses such motion of the input member, and the controller 701 generates the control signal according to the rotation or pivoting of the input member sensed by the encoder. As can be easily understood by those of ordinary skill in the art, the control signal can be set variously according to a manipulation pattern of the input member. The control signal may be a Pulse Width Modulation (PWM) signal, which changes in pulse width along with the operation of the piezo actuator.

FIGS. 8A through 8E illustrate vibration patterns in which the piezo actuator operates according to a control signal generated by the controller.

Figure 8A:
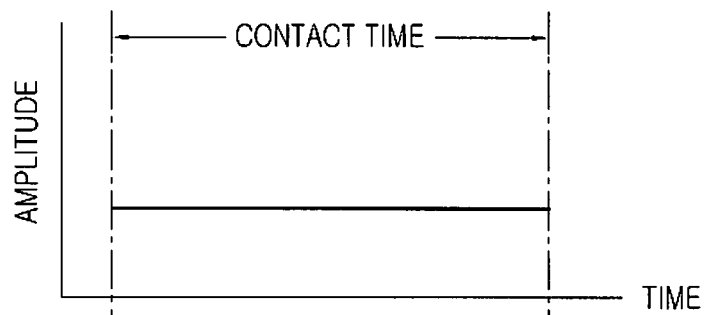
FIGS. 8A through 8E illustrate vibration patterns of a haptic feedback device according to an embodiment of the present invention.
Figure 8B:
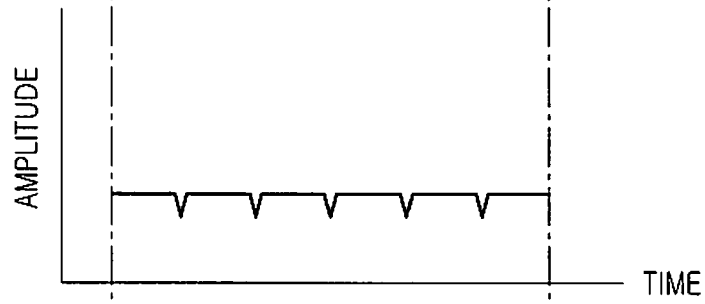
Figure 8C:
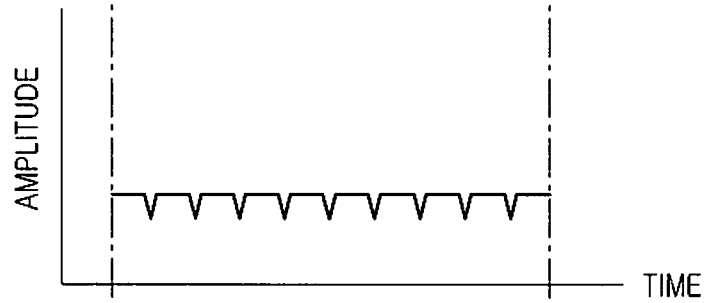
Figure 8D:
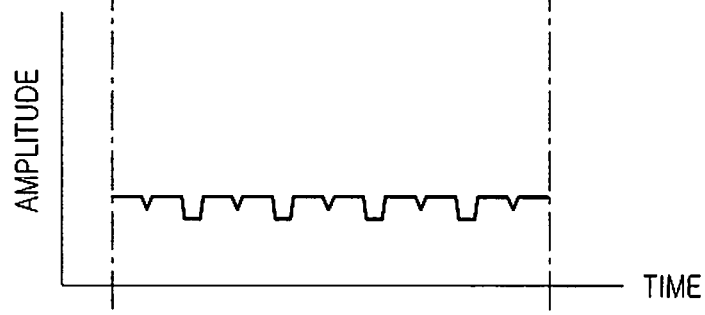
Figure 8E:
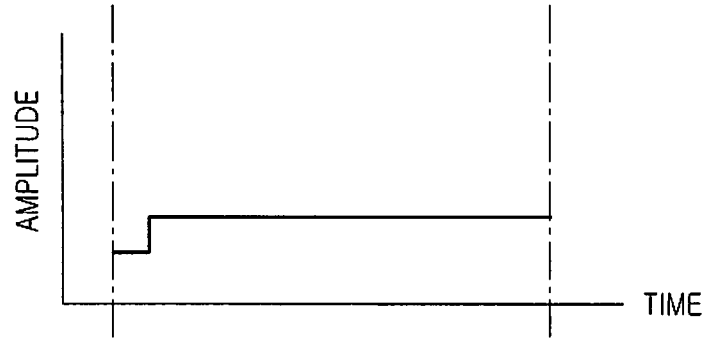

Referring to FIGS. 8A through 8D, when a user contacts the input member for manipulation, the piezo actuator continues specific vibration or operates with regular changes in pulse width. In addition, as illustrated in FIG. 8E, the piezo actuator may be actuated after an elapse of a predetermined time from user contact.

As is apparent from the foregoing description, a haptic feedback device according to the embodiments of the present invention can independently vibrate an input member manipulated directly by a user on the portable terminal and diversify the vibration pattern by using the piezo actuator. Therefore, without intently watching the display device to see if a desired operation is performed well, the user can conveniently manipulate the input member, which is installed separately from the touch screen, and sense if the desired operation is performed well.

While the present invention has been shown and described with reference to certain embodiments thereof, it will be understood by those skilled in the art that various changes in form and details may be made therein without departing from the spirit and scope of the invention as defined by the appended claims.

For example, while the haptic feedback device installed in a touch-screen phone has been used as an example in the detailed embodiments of the present invention, it may also be installed in a cellular phone not including a touch-screen.

Additionally, although the input member of the haptic feedback devices, which are installed separately from a touch screen, have been described by way of example in the embodiments of the present invention, the haptic feedback device may also be installed in a numeric key, a send key, and an end key of a general cellular phone.

What is claimed is:

1. A haptic feedback device for a portable terminal, the haptic feedback device comprising:
   an input member;
   a vibration member that passes through the input member, and serves as a rotation axis of the input member; and
   a piezo actuator in contact with the vibration member,
   wherein as the input member rotates or pivots with respect to the rotation axis, the piezo actuator actuates to vibrate the vibration member, and
   wherein the vibration member vibrates in a straight-line reciprocating movement along the rotation axis.

2. The haptic feedback device of claim 1, wherein the input member comprises a disc-shaped jog dial that rotates with respect to the rotation axis, a portion of a circumference thereof is exposed through a side surface of the portable terminal.

3. The haptic feedback device of claim 1, wherein the input member comprises a disc-shaped wheel key installed on a surface of the portable terminal.

4. The haptic feedback device of claim 1, wherein the input member comprises a navigation key installed on a surface of the portable terminal.

5. The haptic feedback device of claim 4, wherein the navigation key comprises a 2-way key that pivots with respect to the rotation axis.

6. A haptic feedback device for a portable terminal, the haptic feedback device comprising:
   an input member;
   a vibration member that passes through the input member, and serves as a rotation axis of the input member;
   a stopper located at an end of the vibration member; and
   a piezo actuator in contact with the vibration member at an opposite end of the vibration member;
   wherein, as the input member rotates or pivots with respect to the rotation axis, the piezo actuator actuates to vibrate the vibration member, and the input member is guided by the vibration member to perform straight-line movement between the piezo actuator and the stopper.

7. The haptic feedback device of claim 6, wherein the input member rubs against the stopper when rotating or pivoting.

8. The haptic feedback device of claim 1, further comprising:
   an encoder for sensing rotation or pivoting of the input member; and
   a controller for generating a control signal according to the rotation or the pivoting of the input member sensed by the encoder,
   wherein the piezo actuator vibrates the vibration member in response to the control signal.

9. The haptic feedback device of claim 8, wherein the control signal comprises a pulse width modulation signal that changes a width of a vibration of the piezo actuator.

* * * * *